J. S. BARNES.
VARIABLE SPEED GEARING.
APPLICATION FILED APR. 26, 1909.
928,894.
Patented July 20, 1909.
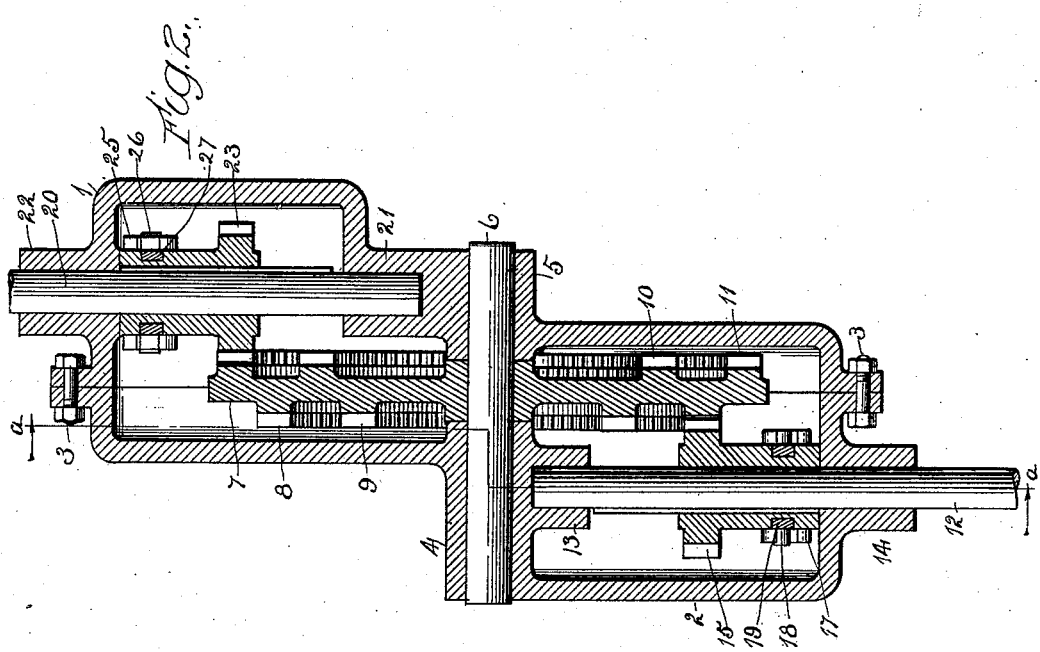
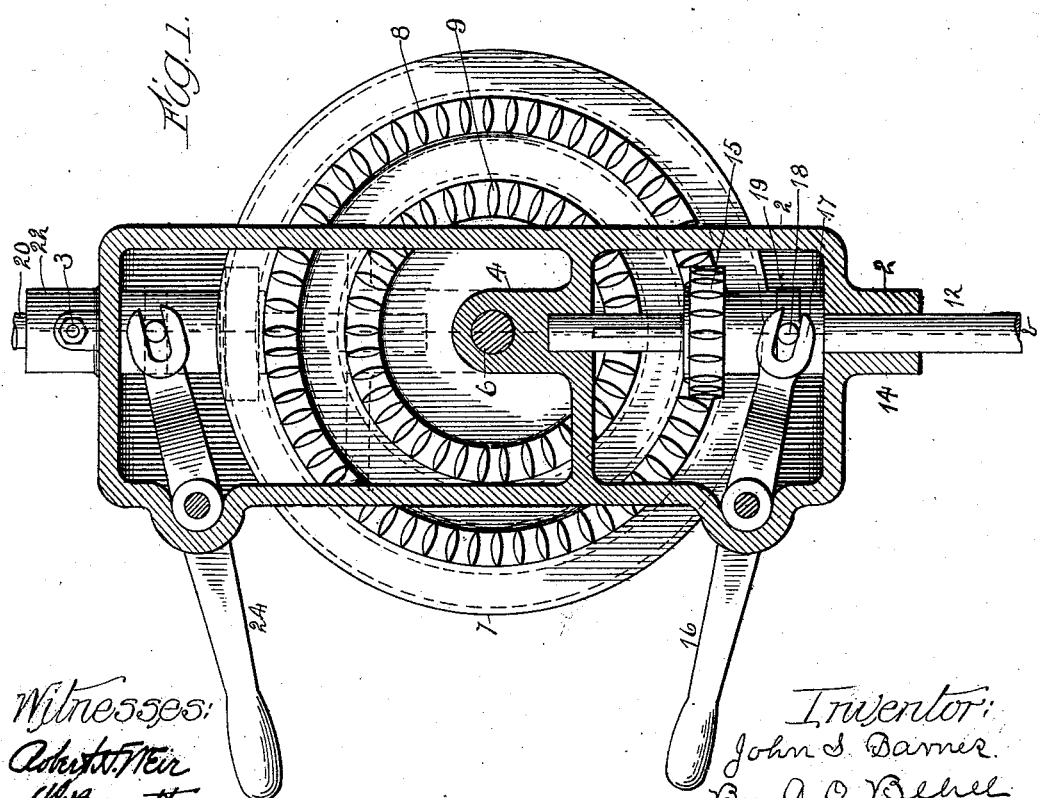
Witnesses:
Inventor:
John S. Barnes.
By A. O. Behel
Atty.

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

VARIABLE-SPEED GEARING.

No. 928,894.　　　　Specification of Letters Patent.　　　Patented July 20, 1909.

Application filed April 26, 1909.　Serial No. 492,427.

*To all whom it may concern:*

Be it known that I, JOHN S. BARNES, a citizen of the United States, residing at Rockford, in the county of Winnebago and State of Illinois, have invented certain new and useful Improvements in Variable-Speed Gearing, of which the following is a specification.

The object of this invention is to impart variable speeds from a driving shaft to a driven shaft.

In the accompanying drawings, Figure 1 is a section on dotted line *a a* Fig. 2. Fig. 2 is a section on dotted line *b* Fig. 1.

The casing in this instance is in two sections 1 and 2 connected by the bolts 3. The two sections of the casing are formed with the bearings 4 and 5 for the shaft 6, to which is fixedly connected a disk 7 having two concentric rings of teeth 8 and 9 on one face, and two concentric rings of teeth 10 and 11 on its opposite face. The rings of teeth on one face are of different diameters than the rings of teeth on the opposite face of the disk. A shaft 12 is supported in the bearings 13 and 14, and to it is splined a toothed-pinion 15. A shipping-lever 16 is pivotally supported by the section 2 of the casing, and its fork 17 engages pins 18 extending from the ring 19 located in a groove in the hub of the toothed-pinion 15. By means of the shipping-lever 16 the toothed-pinion 15 can be moved into mesh with the teeth 8 or 9 of the disk, thereby imparting two speeds to the disk. A shaft 20 is supported in the bearings 21 and 22, and to it is splined a toothed-pinion 23. A shipping-lever 24 is pivotally supported by the section 1 of the casing, and its fork 25 engages pins 26 extending from the ring 27 located in a groove in the hub of the toothed-pinion 23. By means of the shipping-lever 24, the toothed-pinion 23 can be moved into mesh with the teeth 10 or 11 of the disk 7, thereby receiving two speeds from the disk. By means of the two shipping-levers 16 and 24, four speeds can be given to the driven-shaft from the driving-shaft.

It is evident that more rings of teeth can be formed on one or both faces of the disk according to the various speeds desired.

I claim as my invention.

1. A variable speed gearing comprising a disk formed with concentric rings of teeth on both faces, two pinions, each for the teeth on one of the faces of the disk, a shaft for each pinion, and means for moving the pinions into mesh with the teeth on its respective face of the disk.

2. A variable speed gearing comprising a disk formed with concentric rings of teeth on both faces, the rings of teeth on one face differing in diameter from the rings of teeth on the other face, two pinions, each for the teeth on one of the faces of the disk, a shaft for each pinion, and means for moving the pinions into mesh with the teeth on its respective face of the disk.

In testimony whereof I have hereunto set my hand in presence of two subscribing witnesses.

JOHN S. BARNES.

Witnesses:
　A. I. BARNES,
　A. O. BEHEL.